United States Patent [19]

Louis

[11] Patent Number: 4,741,558

[45] Date of Patent: May 3, 1988

[54] TRANSACTIONS SLIPS PACK

[76] Inventor: Joe N. Louis, 3017 Red Hawk Dr., Grand Prairie, Tex. 75051

[21] Appl. No.: 934,182

[22] Filed: Nov. 24, 1986

[51] Int. Cl.[4] .......................... B41L 1/16; B42D 15/00; G09C 1/04; G09F 3/00

[52] U.S. Cl. .......................... 282/8 R; 283/72; 283/74; 283/105

[58] Field of Search .............. 282/8 A, 8 R, 8 B, 8 C, 282/9 R, 9 A, 10, 11, 22 A; 283/72, 70, 105, 74; 194/97 R; 428/916

[56] References Cited

U.S. PATENT DOCUMENTS

| | | | |
|---|---|---|---|
| 393,793 | 12/1888 | Stewart . | |
| 405,820 | 6/1889 | Blanchard . | |
| 563,490 | 7/1896 | Kallman . | |
| 658,422 | 9/1900 | Braly et al. | 283/105 |
| 685,151 | 10/1901 | Landing | 282/8 R |
| 792,312 | 6/1905 | Bush | 283/105 |
| 837,762 | 12/1906 | Wilkenson | 283/105 |
| 1,146,647 | 7/1915 | Mountz . | |
| 1,543,366 | 6/1925 | Candriani . | |
| 1,640,684 | 8/1927 | Zalkind | 283/105 |
| 2,223,089 | 11/1940 | Beuglet | 283/6 |
| 2,238,157 | 4/1941 | Corbin | 164/99 |
| 3,351,005 | 11/1967 | Giori | 101/77 |
| 3,650,210 | 3/1972 | Archer | 101/369 |
| 4,403,793 | 9/1983 | McCormick et al. | 283/105 |

FOREIGN PATENT DOCUMENTS

| | | | |
|---|---|---|---|
| 80373 | 1/1956 | Denmark | 283/105 |
| 575629 | 4/1933 | Fed. Rep. of Germany | 283/105 |
| 2755563 | 6/1979 | Fed. Rep. of Germany | 283/105 |
| 943151 | 3/1944 | France | 283/105 |

*Primary Examiner*—E. R. Kazenske
*Assistant Examiner*—Paul M. Heyrana, Sr.
*Attorney, Agent, or Firm*—Richards, Harris, Medlock & Andrews

[57] ABSTRACT

A sales and credit transaction slip pack with duplicating paper between credit slips is provided. A jagged line of perforations is cut into the duplicating paper at a prescribed position. This position can be such as to obscure an account number and the signature or any other desired combination. When the sales clerk separates copies of the transaction slips the duplicating paper is simultaneously torn and the opportunity for fraud against the purchaser is substantially reduced.

9 Claims, 1 Drawing Sheet

TRANSACTIONS SLIPS PACK

TECHNICAL FIELD

This invention relates to sales and credit transaction slips which are arranged in assembled packs with duplicating paper between slips, and more particularly to a method of obscuring several lines of identifying information on the duplicating paper.

BACKGROUND OF THE INVENTION

In sales and credit card transactions, which are in extensive use today, the merchant is provided with an assembled pack of transaction slips for recording information relating to the merchant, the customer's credit card account number, etc. at defined positions on the slips. The pack may consist for example of a first paper transaction slip to be retained by the merchant, a second paper transaction slip to be given to the customer, and a third paper transaction slip which is forwarded to the bank or credit card issuer. One or more paper duplicating slips having a duplicating medium, commonly known as duplicating carbon slips, are included in the pack, with at least one duplicating carbon slip sandwiched between two transaction slips.

In normal use a sales clerk records the transaction information on the top transaction slip in the pack and may also at the same time imprint information onto all of the transaction slips as enabled by the intermediate duplicating carbon slips. The respective transaction slips are then deleaved or disjoined from the pack for presentment to the customer and the remaining duplicating carbon slips are placed into a container for later disposal.

The transaction slip(s) retained by the merchant may be used to computerize information about the customer, such as frequency of buying and current address. Another important use of this information can be to create a mailing list for advertising. If this information is intercepted by unauthorized personnel, it may lead to a loss of business.

Additionally, it has been found that in some instances certain individuals have obtained the customer's identifying account number from a used duplicating carbon slip and wrongfully utilized this information. Several methods have been utilized to attempt to prevent this unauthorized use. Prior methods include the use of expensive non-carbon duplicating forms, tearing or shredding of the carbon slips, and perforating lines on the carbon slips as can be seen in U.S. Pat. No. 4,403,793 to J. A. McCormick, et al. These methods have, however, proven to be either expensive, dirty, or unable to obscure multiple lines of information.

It is, therefore, the object of this invention to provide a cheap and clean way to effectively obscure multiple lines of information on credit slip carbons.

SUMMARY OF THE INVENTION

A credit transaction slip pack with duplicating paper between credit slips is provided. The duplicating paper has a line of jagged perforations cut into it. The jagged perforations are placed so as to obscure an account number, a signature or any other desired combination. When a sales clerk removes the credit slip copies the duplicating paper is separated along the jagged line of perforations thus effectively destroying any unauthorized records.

The jagged perforations can be relatively large or small depending upon the desired area to be obscured. The line of jagged perforations can also be placed at any desired angle on the duplicating paper. This will allow items located on different parts of the duplicating paper to be obscured.

BRIEF DESCRIPTION OF THE DRAWINGS

For a more complete understanding of the present invention and for further advantages thereof, reference is now made to the following Description of Preferred Embodiments taken in conjunction with the accompanying Drawing, in which.

DESCRIPTION OF THE PREFERRED EMBODIMENTS

Figure 1:
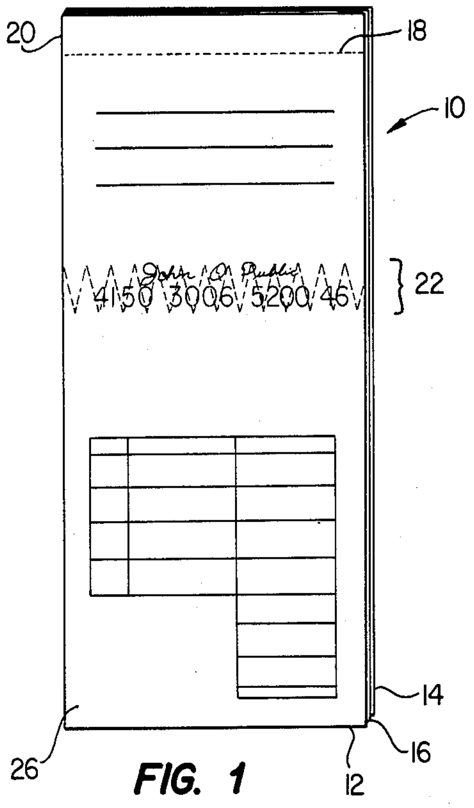
FIG. 1 is a perspective view of the present invention.

Referring to FIG. 1, reference numeral 10 generally identifies the improved transaction slips pack of the present invention. The improved transactions slips pack 10 can be seen in FIG. 1 to consist of at least a top transaction slip 12, a second transaction slip 14, and duplicating paper 16. Duplicating paper 16 is placed between top transaction slip 12 and second transaction slip 14 so that whatever is imprinted on top transaction slip 12 is duplicated on second transaction slip 14. Improved transaction slips pack 10 connects top transaction slip 12, duplicating paper 16, and second transaction slip 14 to each other at one end herein shown as first end 20. Perforations 18 are provided on top transaction slip 12 and second transaction slip 14 near first end 20. A location for multiple lines of confidential identifying information is provided at 22.

Figure 2:
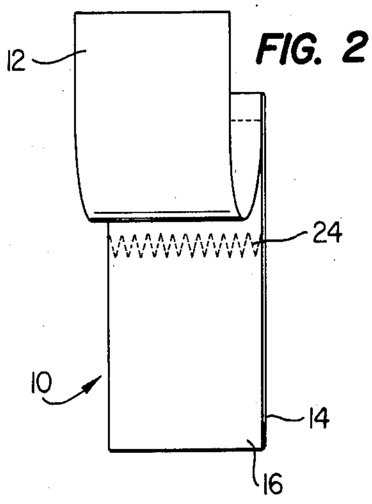
FIG. 2 is a perspective view of the present invention with the top transaction slip pulled back exposing the duplicating paper.
Figure 3:
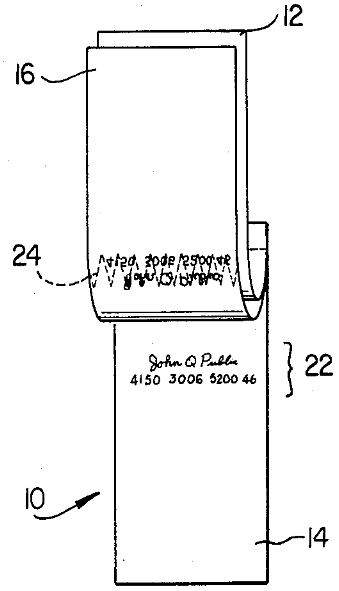
FIG. 3 is a perspective view of the present invention with the top transaction slip and the duplicating paper pulled back exposing the second transaction slip.
Figure 4:
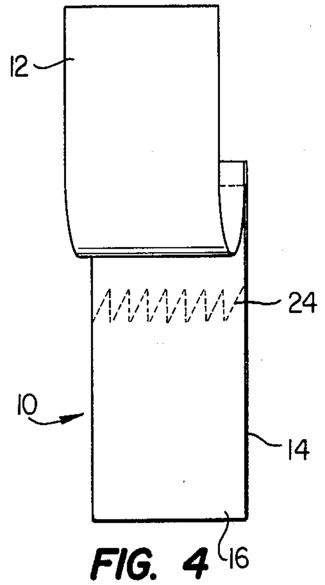
FIG. 4 is a perspective view of the present invention with the top transaction slip pulled back exposing the duplicating paper and showing serrated perforations.

FIG. 2 shows the improved transaction slips pack 10 with the top transaction slip 12 pulled back to expose the duplicating paper 16. Jagged perforations 24 are placed on duplicating paper 16 so as to correspond to the location of multiple lines of confidential identifying information 22 on top transaction slip 12 and second transaction slip 14 as can be seen in FIG. 3. Jagged perforations 24 can be sawtoothed wherein each perforation is slanted as seen in FIG. 2, or serrated wherein one perforation is slanted and the next is vertical as seen in FIG. 4, or any configuration so long as they serve to obscure multiple lines of information.

When a sales transaction is completed the improved transaction slips pack 10 is grasped at the first end 20 and the second end 26 and pulled apart. By pulling, the top transaction slip 12 and the second transaction slip 14 are severed on perforation line 18 and the duplicating paper 16 is severed at jagged perforations 24. Duplicating paper 16 can then be disposed of thus effectively obscuring any confidential identifying information.

Although the present invention has been described with respect to a specific preferred embodiment thereof, various changes and modifications may be suggested to one skilled in the art, and it is intended that the present invention encompass such changes and modifications as fall within the scope of the appended claims.

I claim:

1. An improved transactions slips pack comprising:

at least two transaction slips with a location for multiple parallel lines of confidential identifying information;

an overlying copy slip between said transaction slips;

said overlying copy slip having a strip of jagged perforations, the strip extending along a line parallel to said multiple lines of confidential identifying information;

said strip of jagged perforations corresponding to said location for multiple lines of confidential identifying information; and whereby when the transaction slips are separated the overlying copy slip is also severed at the jagged perforations obscuring any confidential identifying information thereon.

2. The improved transactions slips pack of claim 1, wherein the jagged perforations are sawtoothed.

3. The improved transaction slips pack of claim 1, wherein the jagged perforations are serrated.

4. An improved transaction slips pack comprising:

at least two transaction slips with a location for multiple lines of confidential identifying information;

duplicating paper between said transaction slips;

said transaction slips being attached to each other and said duplicating paper at one end;

said duplicating paper having a strip of jagged perforations;

said jagged perforations corresponding to said location for multiple lines of confidential identifying information; and whereby when the transaction slips are separated the duplicating paper is also severed at the jagged perforations obscuring any confidential identifying information thereon.

5. The improved transaction slips pack of claim 4, wherein the jagged perforations are sawtoothed.

6. The improved transaction slips pack of claim 4, wherein the jagged perforations are serrated.

7. An improved transaction slips pack comprising:

at least two transaction slips with a location for multiple lines of confidential identifying information;

duplicating paper between said transaction slips;

said transaction slips being attached to each other and said duplicating paper at one end;

said transaction slips having a line of perforations near said one end;

said duplicating paper having a strip of jagged perforations;

said jagged perforations corresponding to said location for multiple lines of confidential identifying information; and whereby when the transaction slips are separated at the lines of perforations the duplicating paper is also severed at the jagged perforations obscuring any confidential indentifying information thereon.

8. The improved transaction slips pack of claim 7, wherein the jagged perforations are sawtoothed.

9. The improved transaction slips pack of claim 7, wherein the jagged perforations are serrated.

* * * * *